Dec. 20, 1949   B. G. MAGUIRE   2,491,823
PROTECTIVE COVERING FOR ELECTRICAL CONDUCTORS
Filed March 21, 1946
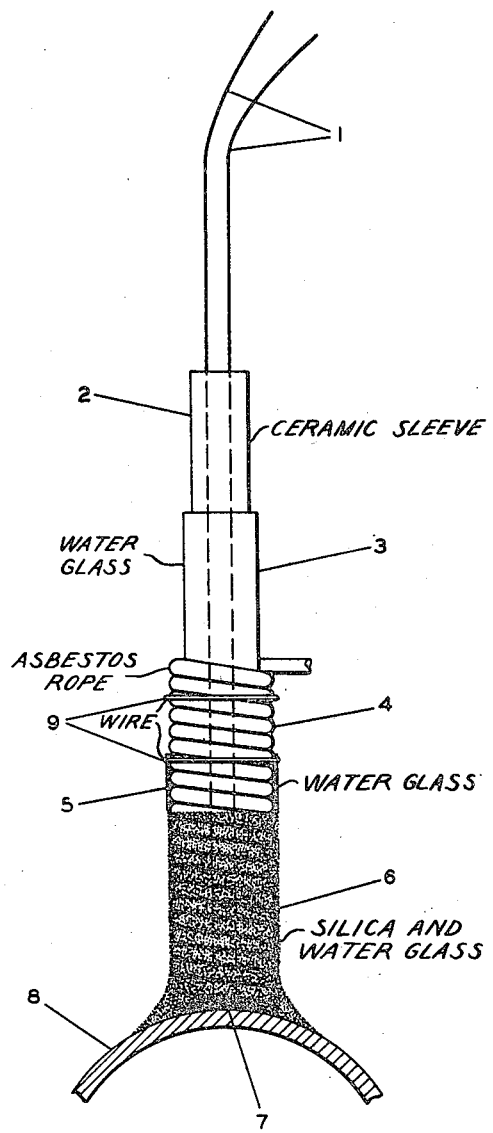
INVENTOR.
B.G. MAGUIRE
BY Hudson & Young
ATTORNEYS Patented Dec. 20, 1949

2,491,823

UNITED STATES PATENT OFFICE 2,491,823

PROTECTIVE COVERING FOR ELECTRICAL CONDUCTORS

Bernard G. Maguire, Alton, Ill., assignor to Phillips Petroleum Company, a corporation of Delaware Application March 21, 1946, Serial No. 656,142

3 Claims. (Cl. 174—120)

This invention relates to thermocouples. In one of its more specific aspects it relates to a method for the protection of thermocouple wires inside furnaces against the detrimental effects of high temperatures.

Oxidizing conditions within furnaces or fire boxes cause more or less rapid oxidation of thermocouple wires of the types used commercially. Failure ultimately results. Frequent replacements may, in part, solve this phase of the temperature measuring problem, but such a solution is ordinarily uneconomic. Many methods have been suggested for the protection of thermocouple wires, some of which have acquired rather wide use.

I have discovered a method for making protective covers for thermocouple wires which has proved successful and covers so made have been in use for long periods of furnace operation.

My invention consists mainly in installing a series of adjacent ceramic or porcelain protectors on thermocouple wires, painting these porcelains with water glass then wrapping with an asbestos cord or rope, moistening the asbestos with water glass and applying Sil-O-Cel powder thereto. When fired, this assembly forms a glassy fusion proof, gas tight seal around the thermocouple.

One object of my invention is to provide a cover for the protection of thermocouple wires against high temperature oxidation.

Another object of my invention is to provide an inexpensive thermocouple wire cover which may be easily applied to thermocouple wires in any or all locations, as may be required in fire boxes.

Yet another object of my invention is to provide thermocouple wire covers which may be applied to thermocouples in any high temperature application wherein the couples are exposed to high temperature combustion conditions.

Still other objects and advantages of my invention will be obvious to those skilled in the art from a careful study of the following description and drawing which respectively describe and illustrate a preferred embodiment of my invention.

The drawing illustrates diagrammatically one form of protective covering according to my invention.

Referring now to the drawing, two thermocouple wires 1, such as 8 gauge "Chromel P" wire which is a commercial thermocouple wire consisting of 90% nickel and 10% chromium, and an 8 gauge "Alumel" wire, which is also a commercial thermocouple wire consisting of 94% nickel, 2% aluminum, 3% manganese and 1% silicon, are covered by porcelain sleeve protectors 2. In the illustration shown the thermocouple has been attached as hereinafter explained to a heater tube for measuring tube temperature. The porcelain protectors 2 then are threaded on and cover the wires from a junction 7 to a point as far up the wires 1 as desired to be protected.

The porcelain protectors are then painted with a thin coat of water glass (sodium silicate) as shown in the figure and identified by reference numeral 3. After this layer of water glass has dried to a sticky condition a wrapping of asbestos cord or small diameter rope 4 is applied.

I have found it advisable to wire the rope windings at occasional intervals, as illustrated and identified by numeral 9, because of the fragile nature of asbestos rope. Again, I apply a coating of water glass 5, this time to the outside of the asbestos rope covering. After this second coating of water glass dries to a tacky condition, I then apply a coating of a thick slurry of Sil-O-Cel powder and water glass 6.

This entire composition is allowed to dry until all chances of steam formation during subsequent heating are passed, then at any time the furnace in which such a protected thermocouple is to be used may be fired. During firing the Sil-O-Cel powder and water glass fuse or otherwise unite to form an infusible, gas tight glassy covering over the thermocouple wires.

In the drawing I have illustrated an embodiment in which the thermocouple junction has been attached to a tube which is intended to be used in a furnace. In this manner, the tube temperature is indicated by the couple and its auxiliary equipment. The auxiliary equipment is not shown on the drawing since it is standard and is manufactured by numerous instrument manufacturers and forms no part of my invention.

As shown on the drawing, the junction has been flattened out and then curved in such a manner as to fit the curvature of a tube 8. This flattened bead or junction may then be attached to the tube 8 by the electric arc weld method using a 25-20 welding rod. After the attachment of the flattened bead as mentioned, and during the painting of the asbestos rope with water glass, water glass and water-glass-Sil-O-Cel slurry layers are applied to a small area of the tube adjacent the thermocouple. In this manner the thermocouple junction and the contact line between the flattened bead and heater tube are better protected.

I have prepared thermocouples and installed them enclosed in the protective coverings as herein disclosed in pipe still furnaces. Several couples, so made and protected, have been used in a furnace for 2,747 onstream hours, and during this time the furnace was closed down several times.

To apply my invention, a thermocouple need not be attached to a furnace tube or other metal object but may be free from contact with any object, under which conditions a couple will measure temperature within any portion of a given furnace volume, flue, or other high temperature space.

The Sil-O-Cel which I have mentioned hereinbefore is the well known trade name for a porous type of siliceous material, frequently called diatomaceous earth, and adapted for heat insulation purposes, at least in part on account of its finely porous nature. While I have disclosed the use of Sil-O-Cel in the above illustration I do not wish to be limited thereby in any manner since other siliceous material such as powdered or finely divided quartz or flint may be used with equal effectiveness.

By a 25-20 welding rod is meant the standard rod of 25 per cent chromium and 20 per cent nickel composition, the remainder of course being substantially iron. Welding rods of other compositions can be used, however, provided the rod metal is adapted to form a strong bond, substantially free from oxide and capable of withstanding high furnace temperatures. I prefer to attach the shaped bead by an electrical weld since less oxide is formed than by other welding methods.

It will be obvious to those skilled in the art that many modification and alterations of my thermocouple covering assembly may be made without departing from the intended spirit and scope of the invention. It is contemplated that the electrical element covering of this invention may be effectively utilized as insulation for any electrical element or conductor, especially those used in areas of high temperature.

Having described my invention, I claim:

1. A method of insulating an electrical conductor which comprises covering said conductor with a series of adjacent ceramic sleeves; coating the outer surfaces of said sleeves with a water glass solution; drying said water glass coating to a tacky consistency; wrapping said coated sleeve with cord asbestos, whereby a heat insulating covering is affixed on said series of sleeves; impregnating the outer surface of said heat insulating wrapping with a water glass solution; drying said impregnation material to a tacky consistency; coating said impregnated insulating covering with a slurry of water glass and a finely divided silica; allowing said insulating covering to dry, whereby all chance of steam formation therefrom is removed; and exposing said insulating covering to a temperature sufficient to fuse said water glass and finely divided silica.

2. The method of claim 1, wherein said finely divided silica is a diatomaceous earth.

3. The method of claim 1, wherein said finely divided silica is powdered quartz.

BERNARD G. MAGUIRE.

REFERENCES CITED

The following references are of record in the file of this patent:

UNITED STATES PATENTS

| Number | Name | Date |
|---|---|---|
| 1,140,701 | Mitchell | May 25, 1915 |
| 1,946,331 | Reeves | Feb. 6, 1934 |
| 2,019,695 | Ross | Nov. 3, 1935 |
| 2,151,648 | Baker | Mar. 21, 1939 |

OTHER REFERENCES

Lancaster et al., General Electric Review, November 1942, page 650.